(12) United States Patent
Chila et al.

(10) Patent No.: US 8,307,655 B2
(45) Date of Patent: Nov. 13, 2012

(54) SYSTEM FOR COOLING TURBINE COMBUSTOR TRANSITION PIECE

(75) Inventors: Ronald James Chila, Greer, SC (US); David William Cihlar, Greenville, SC (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 12/784,477

(22) Filed: May 20, 2010

(65) Prior Publication Data

US 2011/0283707 A1 Nov. 24, 2011

(51) Int. Cl.
*F02C 1/00* (2006.01)
(52) U.S. Cl. .......................... 60/755; 60/752
(58) Field of Classification Search ............. 60/752–760
See application file for complete search history.

(56) References Cited

U.S. PATENT DOCUMENTS

| | | | |
|---|---|---|---|
| 4,719,748 A | 1/1988 | Davis, Jr. et al. | |
| 4,903,477 A * | 2/1990 | Butt | 60/39.37 |
| 6,568,187 B1 | 5/2003 | Jorgensen et al. | |
| 6,640,547 B2 | 11/2003 | Leahy, Jr. | |
| 7,082,766 B1 | 8/2006 | Widener et al. | |
| 7,493,767 B2 | 2/2009 | Bunker et al. | |
| 2009/0249791 A1* | 10/2009 | Belsom | 60/755 |
| 2009/0252593 A1 | 10/2009 | Chila et al. | |

* cited by examiner

*Primary Examiner* — William H Rodriguez
*Assistant Examiner* — Gerald Sung
(74) *Attorney, Agent, or Firm* — Fletcher Yoder P.C.

(57) ABSTRACT

An air cooling hood offset from an exterior of the transition piece to define an air cooling passage between the air cooling hood and the exterior of the transition piece, wherein the air cooling hood comprises a plurality of air outlets disposed along the exterior of the transition piece, and the plurality of air outlets is configured to expel an airflow from the air cooling passage away from the exterior of the transition piece.

24 Claims, 5 Drawing Sheets

SYSTEM FOR COOLING TURBINE COMBUSTOR TRANSITION PIECE

BACKGROUND OF THE INVENTION

The subject matter disclosed herein relates to gas turbine engines and, more specifically, to a system for cooling a transition piece used in a combustor of a gas turbine engine.

Gas turbine engines may include a combustor having a transition piece that connects the combustor to the turbine. As an air-fuel mixture combusts inside of the combustor, the hot combustion gases increase the temperature of the transition piece. Typically, an impingement sleeve completely surrounds the transition piece, and directs compressed air through orifices to impinge an exterior surface of the transition piece. Although the impinging air jets cool the transition piece, the impingement sleeve creates a significant pressure drop that reduces the efficiency of the gas turbine engine. Furthermore, the impingement sleeve generally directs heated air into the combustor, which can increase undesirable exhaust emissions.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine, comprising, a compressor configured to provide compressed air; a combustion chamber configured to combust fuel with the compressed air to generate combustion gas; a turbine configured to be driven by the combustion gas; a transition piece having an interior configured to route the combustion gas from the combustion chamber to the turbine; and an air cooling hood offset from an exterior of the transition piece to define an air cooling passage between the air cooling hood and the exterior of the transition piece, wherein the air cooling hood comprises a plurality of air outlets disposed along the exterior of the transition piece, and the plurality of air outlets is configured to expel an airflow from the air cooling passage away from the exterior of the transition piece.

In a second embodiment, a system includes a turbine combustor transition piece comprising an interior and an exterior, wherein the interior is configured to route a combustion gas from a combustion chamber to a turbine, the exterior comprises a first exterior portion configured to face toward a compressed airflow from a turbine compressor, and the exterior comprises a second exterior portion configured to face away from the compressed airflow from the turbine compressor; and an air cooling hood offset from the second exterior portion to define an air cooling passage between the air cooling hood and the second exterior portion, wherein the air cooling hood comprises a plurality of air outlets configured to expel an airflow from the air cooling passage away from the second exterior portion, and the plurality of air outlets is configured to control the airflow spatially along the second exterior portion.

In a third embodiment, a system including a turbine combustor hood configured to mount at an offset from an exterior of a turbine combustor transition piece to define an air cooling passage between the turbine combustor hood and the exterior, wherein the plurality of air outlets is configured to expel an airflow from the air cooling passage away from the exterior of the turbine combustor transition piece.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards a cooling hood for a transition piece of a gas turbine combustor to provide more effective cooling during operation of a turbine engine. In certain embodiments, the cooling hood only partially (not completely) surrounds the transition piece, such that the cooling hood is partially open to capture a compressed airflow. For example, the compressed airflow may be directed toward a first side of the transition piece, while the cooling hood is spaced apart from a second side of the transition piece opposite from the first side. Upon reaching the cooling hood, the compressed airflow is captured and held against the second side of the transition piece by the cooling hood. The cooling hood then ejects the compressed airflow, as it convectively cools the transition piece and becomes heated, in an outward radial direction away from the transition piece. As appreciated, the cooling hood provides a significantly lower pressure drop than an impingement sleeve, because the cooling hood only partially surrounds the transition piece and directs the compressed airflow in an outward radial direction through fewer openings (i.e., less flow restriction). Furthermore, the cooling hood may provide significantly lower exhaust emissions than an impingement sleeve, because the cooling hood enables the heated airflow to mix with cooler airflow prior to entry into the combustion chamber, e.g., through a head end of the combustor.

Figure 1:
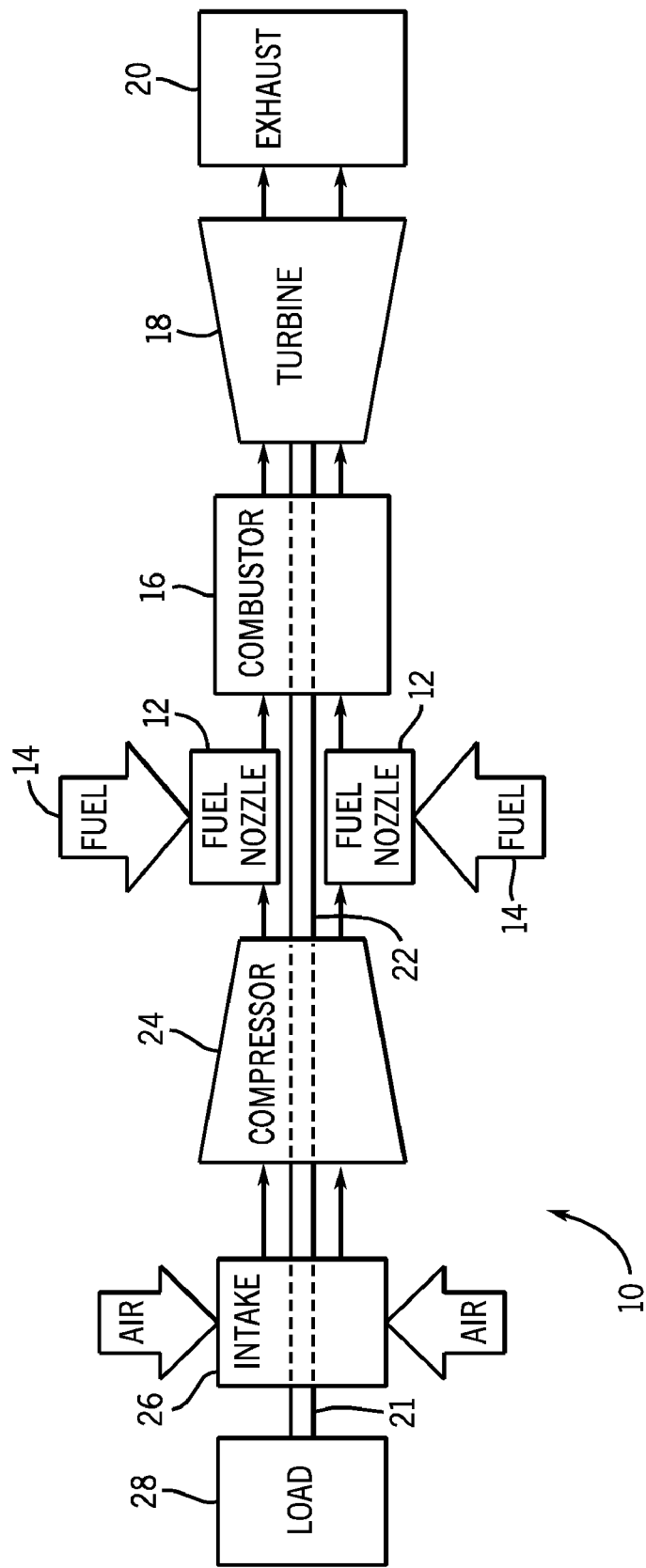
FIG. 1 is a block diagram of an embodiment of a gas turbine having an air cooling hood disposed about a transition piece of a combustor.

FIG. 1 is a block diagram of an embodiment of a turbine system 10 having a cooling hood equipped combustor 16 to reduce backpressure, decrease emissions, and improve performance. The turbine system 10 may use liquid or gas fuel, such as natural gas and/or a hydrogen rich synthetic gas, to run the turbine system 10. As depicted, a plurality of fuel nozzles 12 intakes a fuel supply 14, mixes the fuel with air, and distributes the air-fuel mixture into a combustor 16. The air-fuel mixture combusts in a chamber within combustor 16, thereby creating hot pressurized exhaust gases. The combustor 16 directs the exhaust gases through a turbine 18 toward an exhaust outlet 20. As the exhaust gases pass through the turbine 18, the gases force one or more turbine blades to rotate a shaft 22 along an axis of the system 10. As illustrated, the shaft 22 may be connected to various components of turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. As will be understood, the load 28 may include any suitable device capable of being powered by the rotational output of turbine system 10.

In operation, air enters the turbine system 10 through the air intake 26 and may be pressurized in the compressor 24. The compressed air may then be mixed with gas for combustion within combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive one or more blades within the turbine 18 to rotate the shaft 22 and, thus, the compressor 24 and the load 28. The rotation of the turbine blades causes a rotation of shaft 22, thereby causing blades within the compressor 22 to draw in and pressurize the air received by the intake 26.

Figure 2:
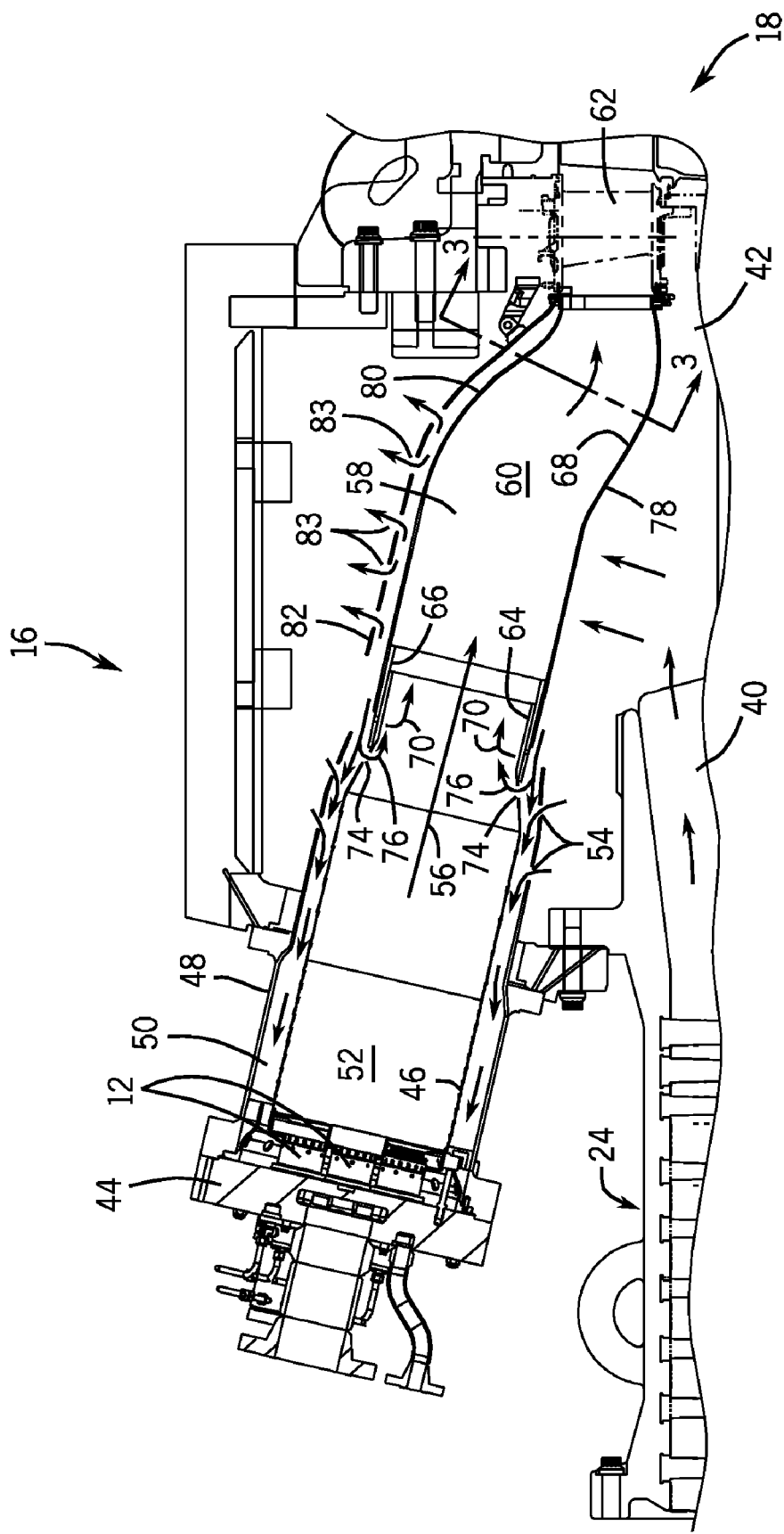
FIG. 2 is a cross-sectional view of an embodiment of a combustor having an air cooling hood disposed about a transition piece.

FIG. 2 is a partial cross-sectional view of an embodiment of the turbine system 10, illustrating details of the cooling hood equipped combustor 16. As will be appreciated, the combustor 16 is generally fluidly coupled to the compressor 24 and the turbine 18. The compressor 24 may include a diffuser 40 and a discharge plenum 42 that are coupled to each other in fluid communication to facilitate the channeling of compressed air to the combustor 16. In the illustrated embodiment, the combustor 16 includes a cover plate 44 at the upstream head end of the combustor 16. The cover plate 44 may at least partially support the fuel nozzles 12 and provide a path through which air and fuel are directed to the fuel nozzles 12.

The combustor 16 includes a combustor liner 46 disposed within a flow sleeve 48. The arrangement of the liner 46 and the flow sleeve 48, as shown in FIG. 2, is generally concentric and may define an annular passage 50. In certain embodiments, the flow sleeve 48 and the liner 46 may define a first or upstream hollow annular wall of the combustor 16. The interior of the liner 46 may define a substantially cylindrical or annular combustion chamber 52. The flow sleeve 48 may include a plurality of inlets 54, which provide a flow path for at least a portion of the air from the compressor 24 into the annular passage 50. In other words, the flow sleeve 48 may be perforated with a pattern of openings to define a perforated annular wall.

Downstream from the liner 46 and the flow sleeve 48 (e.g. in the direction 56), thus, the direction 56 may represent a downstream direction with respect to the flow of combustion gases away from the fuel nozzles 12 inside the liner 46. As used herein, the terms "upstream" and "downstream" shall be understood to relate to the flow of combustion gases inside the combustor 16. For example, a "downstream" direction refers to the direction 56 in which a fuel-air mixture combusts and flows from the fuel nozzles 12 through a transition piece 58 towards the turbine 18, and an "upstream" direction refers to a direction opposite the downstream direction, as defined above.

An interior cavity 60 of the transition piece 58 generally provides a path by which combustion gases from the combustion chamber 52 may be directed thru a turbine nozzle 62 and into the turbine 18. In the depicted embodiment, the transition piece 58 may be coupled to the downstream end of the liner 46 (with respect to direction 56), generally about a downstream end portion 64 (coupling portion). An annular wrapper 66 and a seal may be disposed between the downstream end portion 64 and the transition piece 58. The seal may secure the outer surface of the wrapper 66 to the inner surface 68 of the transition piece 58. Further, as mentioned above, the inner surface of the wrapper 66 may define passages that receive a portion of the airflow from the diffuser 40.

As discussed above, the turbine system 10, in operation, may intake air through the air intake 26. The compressor 24, which is driven by the shaft 22, rotates and compresses the air. The compressed air is discharged into the diffuser 40, as indicated by the arrows shown in FIG. 2. The majority of the compressed air is further discharged from the compressor 24, by way of the diffuser 40, through a plenum 42 into the combustor 16. The air in the annular passage 50 is then channeled upstream (e.g., in the direction of fuel nozzles 12) such that the air flows over the transition piece 58 and the downstream end portion 64 of the liner 46. In the illustrated embodiment, the airflow provides forced convection cooling of the transition piece 58 and the liner 46. In certain embodiments, the downstream end portion 64 of the liner 46 may include a plurality of film cooling holes to provide a film cooling flow 70 and/or by-pass openings 74 to provide a cooling flow 76 into the combustion chamber 52. The remaining airflow in the annular passage 50 is then channeled upstream towards the fuel nozzles 12, wherein the air is mixed with fuel 14 and ignited within the combustion chamber 52. The resulting combustion gases are channeled from the chamber 52 into the transition piece cavity 60 and through the turbine nozzle 62 to the turbine 18.

As discussed above, the hot combustion gases flow from the combustor 16 through the transition piece 58 to the turbine 18. Without sufficient cooling, the hot gases may damage or reduce the life of the transition piece 58. Thus, the transition piece 58 is convectively cooled by the compressed air entering the discharge plenum 42. The air entering the discharge plenum 42 first contacts the transition piece 58 on a first portion 78 (e.g., radially inward side facing incoming airflow). After contacting the first portion 78 of the transition piece 58, the air wraps around the transition piece 58 and flows towards the second portion 80 (e.g., radially outward side facing away from the incoming airflow). In the illustrated embodiment, a cooling hood 82 at least partially surrounds the transition piece 58 at an offset along the second portion 80, while the cooling hood 82 is at least partially or completely open to airflow from the first portion 78. In other words, the illustrated cooling hood 82 does not completely surround the transition piece 58, but is mounted at offset from the second portion 80 to capture and hold the airflow along the second portion 80. For example, the cooling hood 82 may scoop or redirect the airflow passing around opposite sides of the transition piece 58, and then force the airflow to cool the otherwise low velocity region along the second portion 80. Without the cooling hood 82, the second portion 80 would receive substantially less airflow than the first portion 78, because transition piece 58 would cause the airflow to shed and create vortices before reaching the second portion 80. Thus, the cooling hood 82 forces airflow into the otherwise low velocity region along the second portion 80, but allows the airflow to pass freely over the first portion 78 without any restriction (e.g., significantly lower pressure drop as compared with an annular impingement sleeve).

The disclosed cooling hood 82 also includes at least one or more openings 83 to create a pressure differential, which essentially attracts the airflow into the space between the cooling hood 82 and the second portion 80 of the transition piece 58. For example, the pressure differential is due to the low velocity region outside the cooling hood 82 along the second portion 80 of the transition piece 58. In certain embodiments, the number, size, and distribution of the openings 83 may be selected to control the convective air cooling along the second portion 80 of the transition piece 58. The increased airflow over the second portion 80 decreases the temperature of the second portion 80, thereby increasing the life of the transition piece 58.

Figure 3:
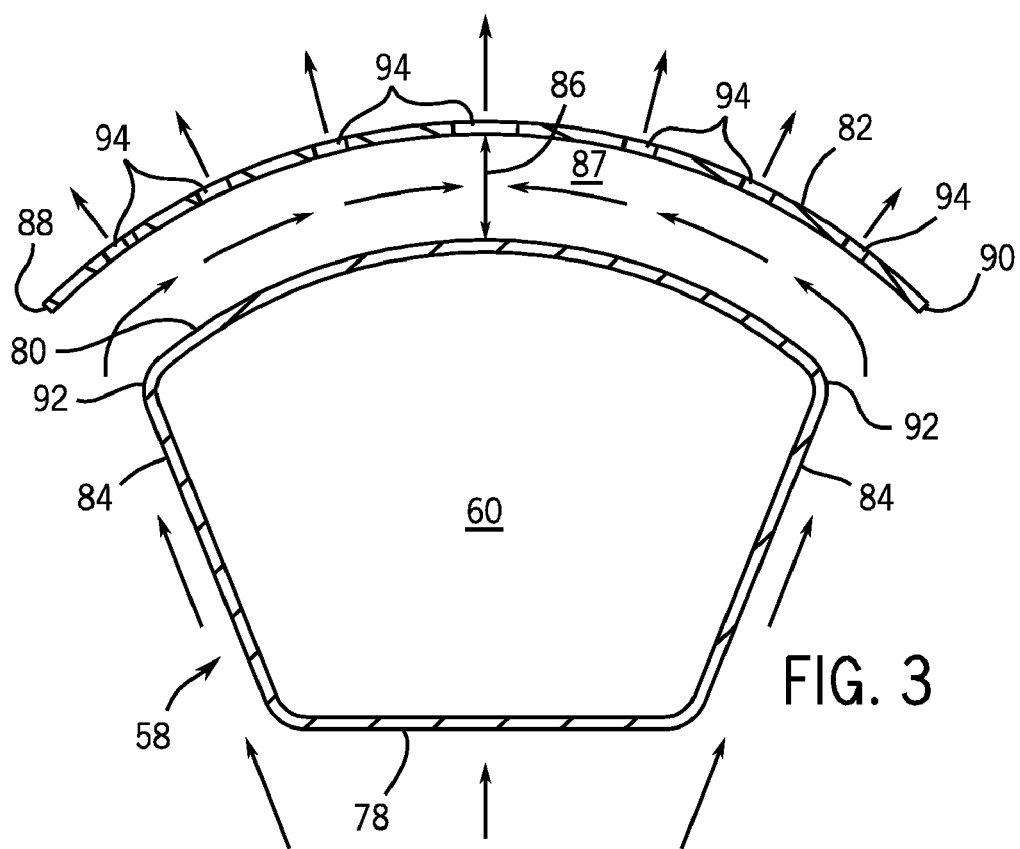
FIG. 3 is a cross-sectional view of an embodiment of the transition piece and the air cooling hood taken along line 3-3 of FIG. 2, illustrating differently sized air openings distributed throughout the air cooling hood.

FIG. 3 is a cross-sectional view of an embodiment of the transition piece 58 and cooling hood 82 taken along line 3-3 of FIG. 2. In the illustrated embodiment, the cooling hood 82 is mounted at an offset distance 86 from the second portion 80 of the transition piece 58, thereby defining a hollow cavity 87 between the cooling hood 82 and the second portion 80. The offset distance 86 may be based on a variety of factors, including fluid dynamics of the airflow and the temperature of the hot combustion gases. However, the offset distance 86 may be equal to or greater than an offset used with an annular impingement sleeve. For example, the offset distance 86 may be approximately 1 to 5 times greater than the offset distance used for an annular impingement sleeve. By further example, the offset distance 86 may range between approximately 0.5 to 5 cm in certain embodiments. As a result, the greater offset distance 86 may further reduce the flow resistance and pressure drop as compared with an annular impingement sleeve. Furthermore, the offset distance 86 may be uniform or variable along hollow cavity 87 between the cooling hood 82 and the second portion 80. For example, the offset distance 86 may gradually increase or decrease toward a central portion of the cooling hood 82, thereby providing control of the cooling airflow to differentially cool the second portion 80 of the transition piece 58.

As further illustrated in FIG. 3, the cooling hood 82 includes a first side 88 (e.g., left edge) and a second side 90 (e.g., right edge) to capture and draw in the airflow. The illustrated cooling hood 82 also includes a curvature (e.g., semi-cylindrical) between the first side 88 and the second side 90, thereby following the curved shape of the second portion 80 of the transition piece 58. In certain embodiments, the curvature of the cooling hood 82 may be selected to control the cooling airflow to provide differential cooling of the second portion 80. For example, the curvature may be sloped toward hot spots along the second portion 80, thereby preferentially increasing cooling of the hot spots. In other embodiments, the cooling hood 82 may have no curvature. In the present embodiment, the sides 88 and 90 of the cooling hood 82 protrude laterally away from opposite sides 92 of the transition piece 58. In other words, the sides 88 and 90 of the cooling hood 82 extend directly into the airflow passing along the opposite sides 92, thereby enabling the cooling hood 82 to scoop, capture, or generally redirect the airflow into the hollow cavity 87 between the cooling hood 82 and the second portion 80. However, other embodiments of the cooling hood 82 may not protrude away from the sides 92 of the second portion 80.

As mentioned above, the cooling hood 82 may include one or more openings 94 to create a pressure differential to attract airflow into the hollow cavity 87, while also enabling the airflow (after convectively cooling the second portion 80) to eject radially outward away from second portion 80. In the illustrated embodiment, the openings 94 are non-uniform and vary in size to provide differential cooling along the second portion 80 of the transition piece 58. For example, a larger sized opening 94 provides a lesser flow restriction, and thus a greater radially outward flow away from the second portion 80. In contrast, a smaller sized opening 94 provides a greater flow restriction, and thus a lesser radially outward flow away from the second portion 80. In other words, the variation in the size of openings 94 creates a variable flow resistance and pressure differential between the hollow cavity 87 and the space external to the cooling hood 82. Furthermore, the variation in size of the openings 94 creates a pressure differential in the hollow cavity 87, thereby ensuring flow from the high-pressure zones toward the low-pressure zones for improved cooling throughout the hollow cavity 87. For example, the smaller openings 94 create higher-pressure zones in the hollow cavity 87, and the larger openings 94 create lower pressure zones in the hollow cavity 87.

Accordingly, the cooling hood 82 may include larger sized openings 94 in hot spots (e.g., toward the center) and smaller sized openings 94 in cold/cooler spots (e.g., toward the sides 88 and 90). For example, in the illustrated embodiment, the openings 94 become progressively larger as they approach the center of the cooling hood 82. In this manner, the variable sized openings 94 differentially provide more outward airflow near the center of the cooling hood 82, while providing less outward airflow near the sides 88 and 90. The variation in size of the openings 94 may therefore enable more air movement at the center of the second portion 80 where heat removal is most difficult, while also creating a pressure differential to attract the air to the center of the second portion 80.

Figure 4:
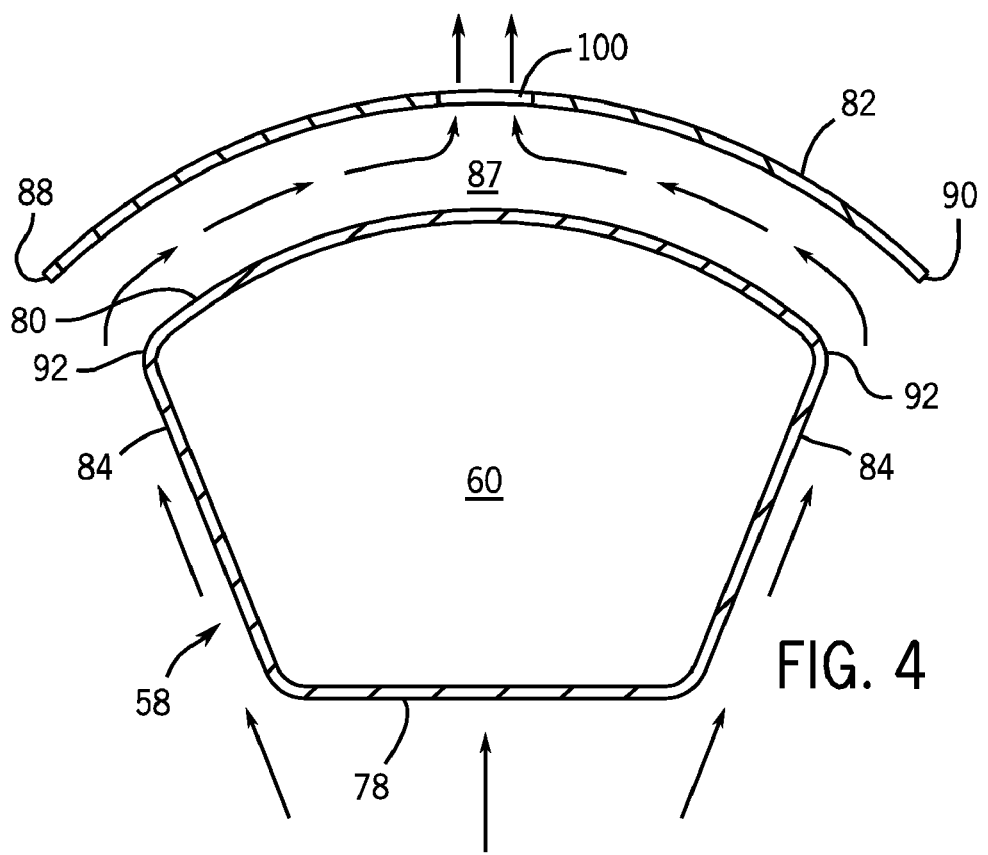
FIG. 4 is a cross-sectional view of an embodiment of the transition piece and the air cooling hood taken along line 3-3 of FIG. 2, illustrating a central slot in the air cooling hood.

FIG. 4 is a cross-sectional view of an embodiment of the transition piece 58 and cooling hood 82 taken along line 3-3 of FIG. 2. In the illustrated embodiment, the cooling hood 82 defines one or more central openings 100 along the center of the cooling hood 82. In one embodiment, the opening 100 may be a single slot extending lengthwise along the cooling hood 82 between upstream and downstream portions of the hood 82. For example, the slot 100 may be a rectangular slot of equal or variable width, an oval slot of equal or variable width, or any other shape. By further example, the opening 100 may include a plurality of openings in series, e.g., aligned with one another and spaced apart, lengthwise along the cooling hood 82 between upstream and downstream portions of the hood 82. In the illustrated embodiment, the central location of the opening 100 provides the maximum cooling toward the center of the cooling hood 82, and thus the second portion 80 of the transition piece 58. Again, the opening 100 is configured to create a pressure differential, which attracts the airflow into the hollow cavity 87 and ejects the airflow outwardly away from the second portion 80 of the transition piece 58.

Figure 5:
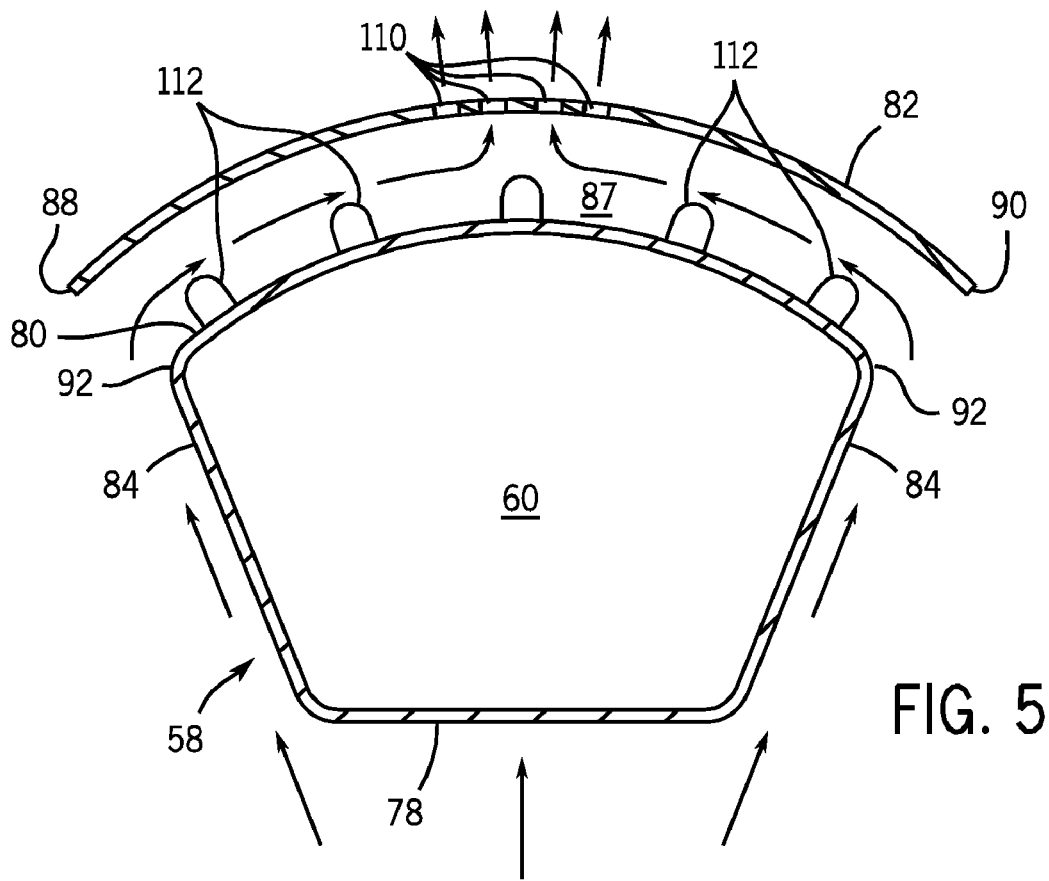
FIG. 5 is a cross-sectional view of an embodiment of the transition piece and the air cooling hood taken along line 3-3 of FIG. 2, illustrating a central group of air openings in the air cooling hood.

FIG. 5 is a cross-sectional view of an embodiment of the transition piece 58 and cooling hood 82 taken along line 3-3 of FIG. 2. In the illustrated embodiment, the cooling hood 82 defines a plurality of central openings 110 (e.g., a central group) along the center of the cooling hood 82. For example, the openings 110 may be a plurality of parallel slots in close proximity to one another, and also extending lengthwise along the cooling hood 82 between upstream and downstream portions of the hood 82. By further example, the openings 110 may be a plurality of circular openings, oval openings, square openings, rectangular openings, or another suitable shape, which are spaced apart both crosswise (e.g., between sides 88 and 90) and lengthwise along the cooling hood 82. The illustrated openings 110 include four openings spaced apart crosswise between the sides 88 and 90. However, the openings 110 may include any number of openings, e.g., 2 to 1000. Again, the central location of the openings 110 provides the maximum cooling toward the center of the second portion 80 by creating a pressure differential, which attracts the airflow into the hollow cavity 87 and ejects the airflow outwardly away from the second portion 80 of the transition piece 58.

In addition, the transition piece 58 may define surface enhancements 112 to increase convective air cooling by increasing the surface area and/or turbulence in the hollow cavity 87. For example, the surface enhancements 112 may include protrusions, recesses, or any combination thereof. The illustrated surface enhancements 112 include ribs, fins, or pins extending radially into the hollow cavity 87. However, the surface enhancements 112 are not limited to any particular shape, and may include dimples, cavities, an array of grooves, an array of convex or concave surfaces, or a patterned surface treatment. While the surface enhancements 112 are shown on the second portion 80, the surface enhancements 112 may cover the entire transition piece 58 or any portion thereof.

Figure 6:
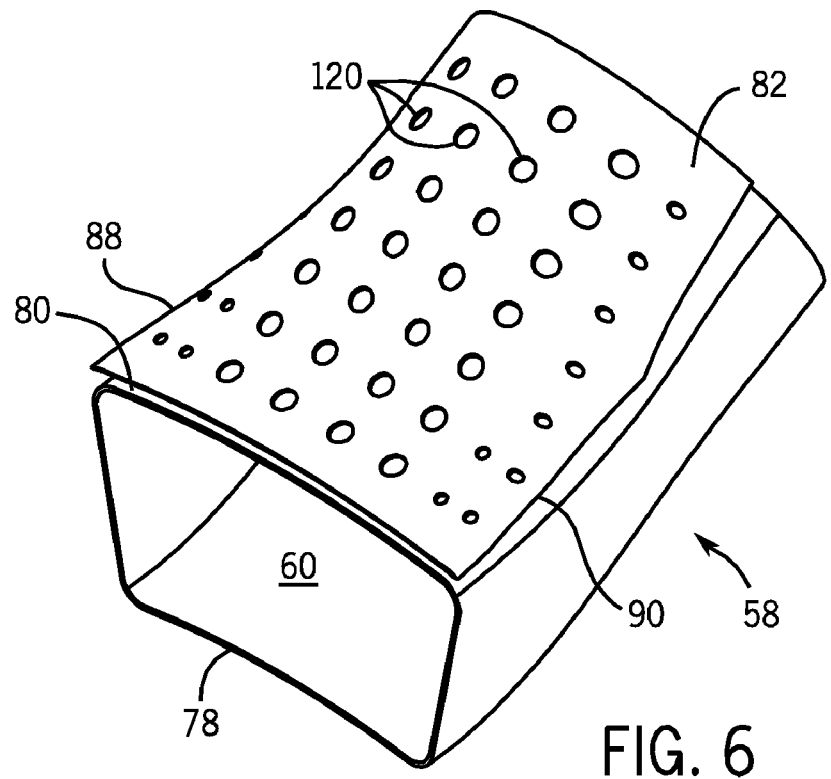
FIG. 6 is a perspective view of an embodiment of a transition piece and an air cooling hood, illustrating differently sized air openings distributed throughout the air cooling hood.

FIG. 6 is a perspective view of an embodiment of a transition piece 58 and cooling hood 82, illustrating a plurality of openings 120 distributed throughout the cooling hood 82. In the present embodiment, the openings 120 progressively increase in size (e.g., diameter) from the sides 88 and 90 of the cooling hood 82 toward the center of the cooling hood 82. As discussed above with respect to FIG. 3, the variably sized openings 120 create a pressure differential that attract the flow and moves the flow over second portion 80 of the transition piece 58. The smaller openings 120 create higher-pressure zones in the hollow cavity 87, and the larger openings 120 create lower pressure zones in the hollow cavity 87. In addition, the hollow cavity 87 represents a higher-pressure zone than the space external to the cooling hood 82. These differences in pressure attract the flow into the hollow cavity 87, flow the air to hot spots along the second portion 80, and eject the heated air away from the second portion 80 of the transition piece 58. In the illustrated embodiment, the openings 120 are generally spaced uniformly across the cooling hood 82 both in the crosswise direction (e.g., between sides 88 and 90) and the lengthwise direction. Furthermore, the illustrated openings 120 are generally aligned with one another along the cooling hood 82 both in the crosswise direction (e.g., multiple rows between sides 88 and 90) and the lengthwise direction (e.g., multiple columns parallel to the sides 88 and 90). In other embodiments, the openings 120 may be non-uniformly spaced and/or out of alignment with one another (e.g., random).

Figure 7:
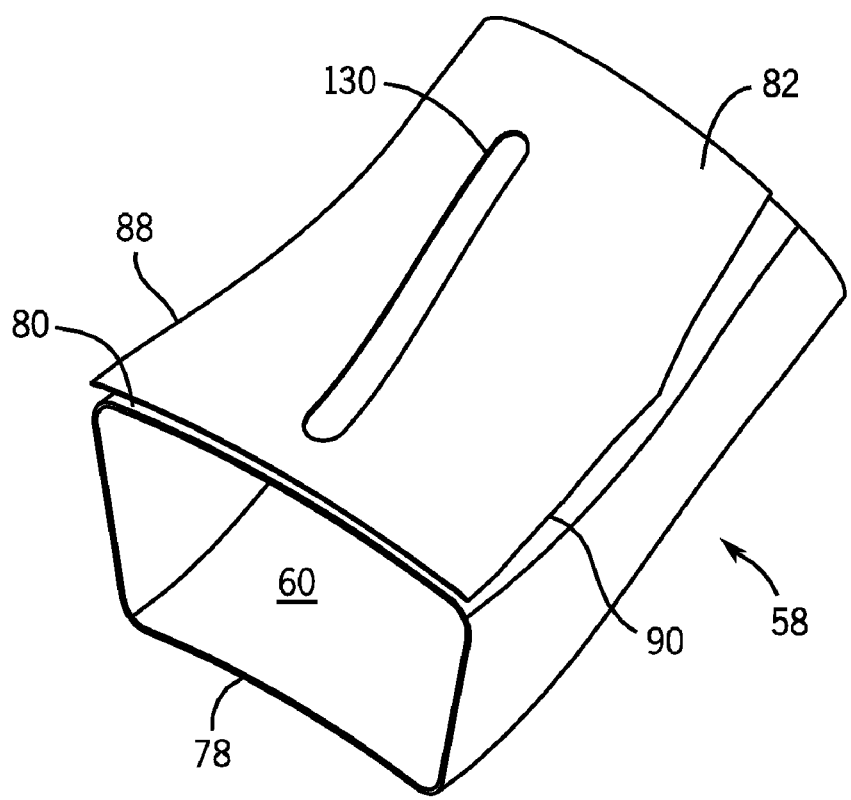
FIG. 7 is a perspective view of an embodiment of a transition piece and an air cooling hood, illustrating a central slot in the air cooling hood.

FIG. 7 is a perspective view of an embodiment of a transition piece 58 and cooling hood 82, illustrating a single slot or slit 130 extending lengthwise along a central portion of the cooling hood 82. For example, the slit 130 may be equally spaced and/or parallel relative to the sides 88 and 90 of the cooling hood 82. In the illustrated embodiment, the slit 130 attracts the airflow and moves it over the second portion 80, and provides maximum cooling by the outward airflow along the center of the cooling hood 82. Although FIG. 7 illustrates a single slit 130 parallel to the sides 88 and 90, other embodiments may include one or more slits 130 extending parallel and/or perpendicular to the sides 88 and 90. In certain embodiments, each slit 130 may have a uniform width, or a variable width to provide differential cooling along the second portion 80 of the transition piece 58. Furthermore, each slit 130 may be sized differently than the other slits 130, e.g., different lengths and/or widths, thereby providing another degree of differential cooling of the second portion 80 of the transition piece 58. For example, a slit 130 perpendicular to the sides 88 and 90 may progressively increase in width from the sides 88 and 90 toward the center of the cooling hood 80.

Figure 8:
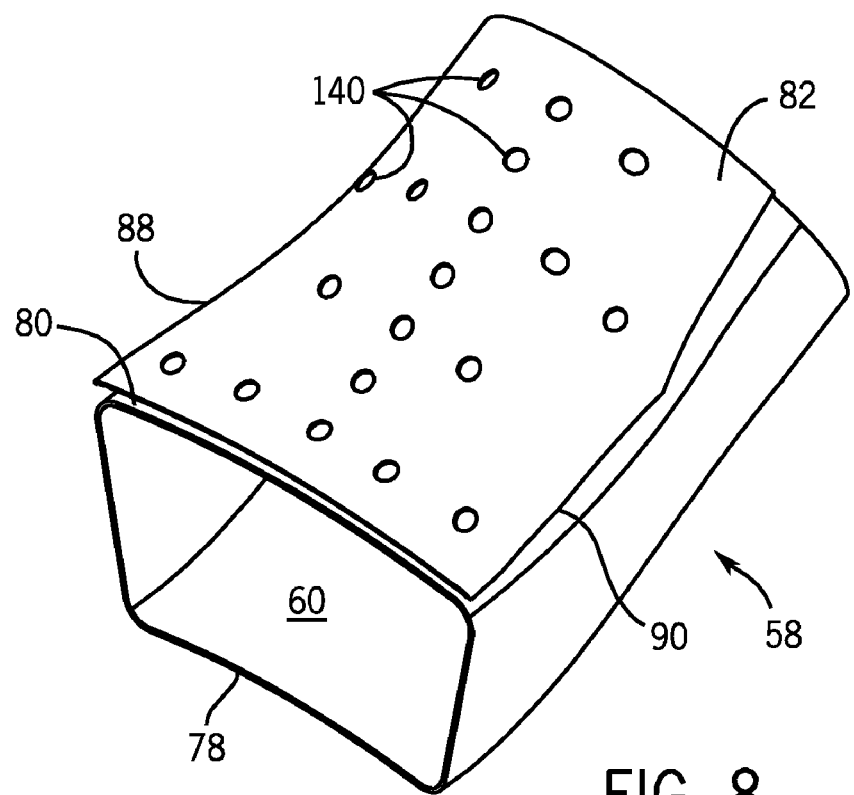
FIG. 8 is a perspective view of an embodiment of a transition piece and an air cooling hood, illustrating uniformly sized air openings distributed non-uniformly throughout the air cooling hood.

FIG. 8 is a perspective view of a transition piece 58 and cooling hood 82, illustrating a plurality of openings 140 distributed non-uniformly throughout the cooling hood 82. As illustrated, the openings 140 are more closely spaced and concentrated toward a central region of the cooling hood 82, while the openings 140 are spaced further apart toward the sides 88 and 90. Thus, the non-uniform spacing of the openings 140 is configured to provide differential cooling of the second portion 80 of the transition piece 58. The illustrated openings 140 are progressively closer together toward the central region, thereby providing the least flow resistance and maximum outward airflow near the central region to ensure sufficient cooling of the central hot spots. In the illustrated embodiment, the openings 140 have a uniform size and shape (e.g., equal diameter circular holes). However, other embodiments of the openings 140 may have different shapes and/or unequal sizes.

The technical effects of the invention include a substantially reduced pressure drop and increased efficiency associated with cooling a transition piece of a gas turbine combustor. In particular, the disclosed embodiments eliminate the flow resistance and pressure drop typically associated with an annular impingement sleeve by employing a cooling hood along the transition piece opposite from the incoming airflow. The cooling hood not only reduces the pressure drop, but the cooling hood also ejects the heated airflow away from the transition piece to mix with cooler air before entry into the combustor. In this manner, the cooler airflow entering the combustor serves to reduce undesirable exhaust emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine, comprising:
      a compressor configured to provide compressed air;
      a combustion chamber configured to combust fuel with the compressed air to generate combustion gas;
      a turbine configured to be driven by the combustion gas;
      a transition piece having an interior configured to route the combustion gas from the combustion chamber to the turbine; and
      an air cooling hood offset from an exterior of the transition piece to define an air cooling passage between the air cooling hood and an exterior of the transition piece, wherein the air cooling hood comprises a plurality of air outlets disposed along the exterior of the transition piece, wherein the plurality of air outlets are non-uniformly sized, non-uniformly spaced, non-uniformly shaped, or a combination thereof, to control the airflow spatially along the exterior of the transition piece, and the plurality of air outlets is configured to expel an airflow from the air cooling passage away from the exterior of the transition piece.

2. The system of claim 1, wherein the air cooling hood extends only partially circumferentially around the exterior of the transition piece to first and second sides of the air cooling hood.

3. The system of claim 2, comprising a first air inlet between the first side of the air cooling hood and the exterior of the transition piece, and a second air inlet between the second side of the air cooling hood and the exterior of the transition piece.

4. The system of claim 3, wherein the plurality of air outlets is configured to control the airflow spatially along the exterior of the transition piece.

5. The system of claim 4, wherein the plurality of air outlets comprises differently sized openings configured to control the airflow spatially along the exterior of the transition piece.

6. The system of claim 4, wherein the plurality of air outlets comprises differently spaced openings configured to control the airflow spatially along the exterior of the transition piece.

7. The system of claim 6, wherein the plurality of air outlets comprises differently sized openings configured to control the airflow spatially along the exterior of the transition piece.

8. The system of claim 6, wherein the plurality of air outlets comprises uniformly sized openings.

9. The system of claim 1, wherein the plurality of air outlets is non-uniformly sized, non-uniformly spaced, or a combination thereof, to control the airflow spatially along the exterior of the transition piece.

10. The system of claim 1, wherein the exterior of the transition piece comprises first and second exterior portions on opposite sides of the transition piece, the gas turbine engine directs the compressed air toward the first exterior portion, and the air cooling hood is disposed along the second exterior portion.

11. The system of claim 1, wherein the plurality of air outlets comprises differently shaped openings to control the airflow spatially along the exterior of the transition piece.

12. A system, comprising:
    a turbine combustor transition piece comprising an interior and an exterior, wherein the interior is configured to route a combustion gas from a combustion chamber to a turbine, the exterior comprises a first exterior portion configured to face toward a compressed airflow from a turbine compressor, and the exterior comprises a second exterior portion configured to face away from the compressed airflow from the turbine compressor; and
    an air cooling hood offset from the second exterior portion to define an air cooling passage between the air cooling hood and the second exterior portion, wherein the air cooling hood comprises a plurality of air outlets configured to expel an airflow from the air cooling passage away from the second exterior portion, and the plurality of air outlets are non-uniformly sized, non-uniformly spaced, non-uniformly shaped, or a combination thereof, to control the airflow spatially along the second exterior portion.

13. The system of claim 12, wherein the plurality of air outlets comprises differently sized openings configured to control the airflow spatially along the second exterior portion.

14. The system of claim 12, wherein the plurality of air outlets comprises differently spaced openings configured to control the airflow spatially along the second exterior portion.

15. The system of claim 14, wherein the plurality of air outlets comprises differently sized openings configured to control the airflow spatially along the second exterior portion.

16. The system of claim 14, wherein the plurality of air outlets comprises uniformly sized openings.

17. The system of claim 12, wherein the air cooling hood extends only partially circumferentially around the exterior of the turbine combustor transition piece to first and second sides of the air cooling hood, a first air inlet is defined between the first side of the air cooling hood and the exterior of the turbine combustor transition piece, and a second air inlet is defined between the second side of the air cooling hood and the exterior of the turbine combustor transition piece.

18. The system of claim 12, wherein the plurality of air outlets comprises differently shaped openings to control the airflow spatially along the exterior of the turbine combustor transition piece.

19. A system, comprising:
    a gas turbine outer casing;
    a turbine combustor hood disposed inside the gas turbine outer casing wherein the turbine combustor hood is configured to mount at an offset from an exterior of a turbine combustor transition piece to define an air cooling passage between the turbine combustor hood and the exterior, the turbine combustor hood includes a plurality of air outlets configured to expel an airflow from the air cooling passage away from the exterior of the turbine combustor transition piece toward the gas turbine outer casing, and the plurality of air outlets are non-uniformly sized, non-uniformly spaced, non-uniformly shaped, or a combination thereof, to control the airflow spatially along the exterior of the turbine combustor transition piece.

20. The system of claim 19, wherein the turbine combustor hood comprises first and second sides, the first side is configured to define a first air inlet between the turbine combustor hood and the exterior of the turbine combustor transition piece, and the second side is configured to define a second air inlet between the turbine combustor hood and the exterior of the turbine combustor transition piece.

21. The system of claim 19, wherein the plurality of air outlets comprises differently sized openings to control the airflow spatially along the exterior of the turbine combustor transition piece.

22. The system of claim 21, wherein the plurality of air outlets is non-uniformly sized, non-uniformly spaced, or a combination thereof, to control the airflow spatially along the exterior.

23. The system of claim 19, wherein the plurality of air outlets comprises differently spaced openings to control the airflow spatially along the exterior of the transition piece.

24. The system of claim 19, wherein the plurality of air outlets comprises differently shaped openings to control the airflow spatially along the exterior of the turbine combustor transition piece.

* * * * *